(12) United States Patent
Hsu et al.

(10) Patent No.: US 8,405,980 B2
(45) Date of Patent: Mar. 26, 2013

(54) COMPUTER HOUSING

(75) Inventors: Chien-Hsing Hsu, Taoyuan County (TW); Chin-Yueh Liu, New Taipei (TW); Chuan-Feng Chen, Taipei (TW)

(73) Assignees: Silitek Electronic (Guangzhou) Co., Ltd., Guangzhou (CN); Lite-On Technology Corporation, Taipei (TW)

( * ) Notice: Subject to any disclaimer, the term of this patent is extended or adjusted under 35 U.S.C. 154(b) by 44 days.

(21) Appl. No.: 13/205,550

(22) Filed: Aug. 8, 2011

(65) Prior Publication Data
US 2012/0099271 A1  Apr. 26, 2012

(30) Foreign Application Priority Data
Oct. 22, 2010 (CN) .................... 2010 2 0571618 U (51) Int. Cl.
*H05K 5/00* (2006.01)
*H05K 7/00* (2006.01)
(52) U.S. Cl. ......... 361/679.58; 361/679.02; 361/679.57; 361/679.6
(58) Field of Classification Search ............. 361/679.02, 361/679.57, 679.58, 679.6
See application file for complete search history.

(56) References Cited

U.S. PATENT DOCUMENTS

| | | | | |
|---|---|---|---|---|
| 5,975,659 A * | 11/1999 | Yang et al. | ................. | 312/223.2 |
| 6,356,436 B1 * | 3/2002 | Buican et al. | ............ | 361/679.58 |
| 6,555,747 B2 * | 4/2003 | Chen et al. | ..................... | 174/559 |
| 6,906,927 B2 * | 6/2005 | Su | ................. | 361/727 |
| 7,082,036 B2 * | 7/2006 | Cheng et al. | ................. | 361/726 |
| 7,643,287 B2 * | 1/2010 | Sung et al. | ............... | 361/679.58 |
| 7,672,124 B2 * | 3/2010 | Zhang et al. | ............. | 361/679.58 |
| 2005/0040740 A1 * | 2/2005 | Yun | ............................ | 312/223.2 |

* cited by examiner

*Primary Examiner* — Anthony Haughton
(74) *Attorney, Agent, or Firm* — Li & Cai Intellectual Property (USA) Office (57) ABSTRACT

A computer housing includes a front plate, a front panel and a fixing mechanism for the front panel. The front plate has at least two holes. The front panel has at least two engaging slots corresponding to the holes. The fixing mechanism includes two hooking plates and at least two springs. The hooking plates are slidably disposed on an inner side of the front plate. Each of the hooking plates has at least one hook passing through the hole to limit the hooking plate slidably between a first position and a second position. The spring connects the hooking plate and the front plate. The elasticity of the spring enforces the hooking plate and the hook abuts one edge of the hole to maintain the hooking plate on the first position.

10 Claims, 13 Drawing Sheets

COMPUTER HOUSING

BACKGROUND OF THE INVENTION

1. Field of the Invention

The present invention is related to computer housing, and more particular to a computer housing having a front panel of the computer housing that can be easily assembled and detached.

2. Description of Related Art

Figure 1:
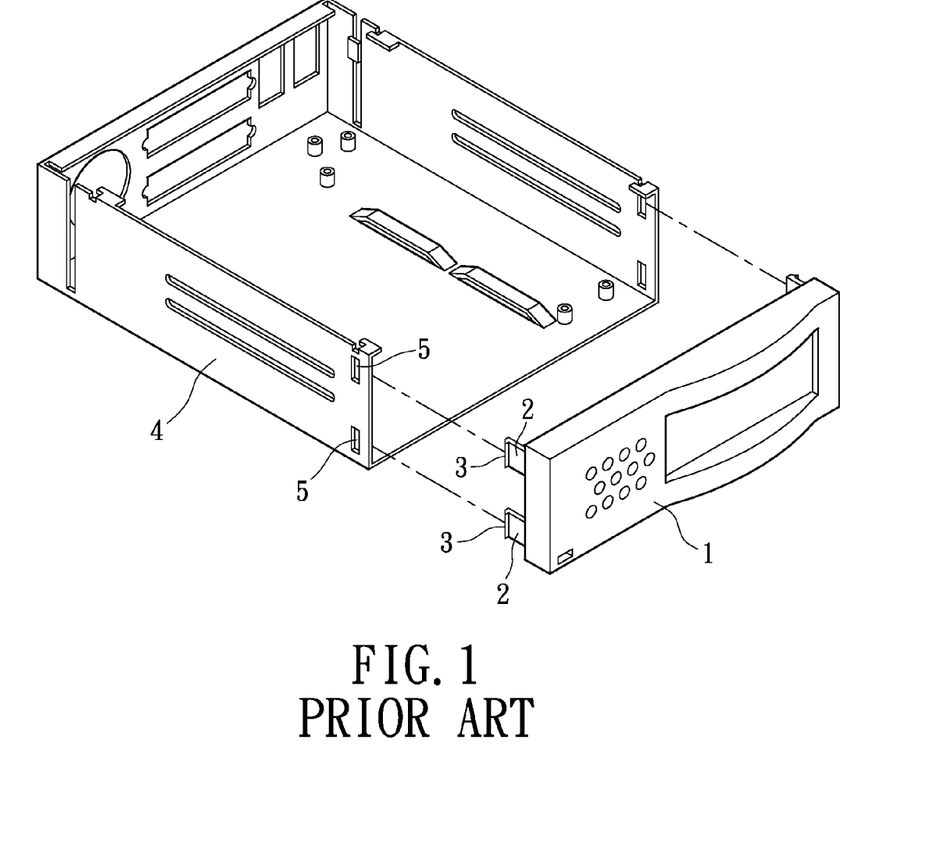
FIG. 1 is a schematic view of a conventional computer housing.

A conventional way to attach a front panel to a computer housing is by forming several hooks on the front panel to directly engage a plurality of corresponding slots arranged on a front plate of the computer housing. FIG. 1 shows a conventional coupling mechanism for the front panel of the computer housing. The front panel 1 has several hooks 2 formed on two lateral sides thereof. Each end of the hooks 2 is bent outward and has a slanted surface 3. When the hooks 2 of the front panel 1 are pushed toward corresponding several slots 5 formed on two lateral sides of the front plate of the housing 4, the slanted surface 3 abuts the slot 5 to deform elastically. When the hooks 2 enter the slots 5 completely, the hooks 2 would spring back to tightly engage the slots 5, thus the front panel 1 is mechanically coupled to the housing 4.

In such a structure, the front panel needs several hooks 2 to attach with the computer housing in an engagement. When removing the front panel, a side board of the housing need to be removed first and pulls the hooks of the front panel one by one away from the housing, then the front panel can be removed from the housing. Thus, making the removal of the front panel rather inconvenient. Moreover, the hooks may be broken at a root part thereof because of improper exerting force during the uninstalling operation.

SUMMARY OF THE INVENTION

The object of the invention is to provide a computer housing having a novel coupling mechanism for fixing a front panel thereof, so as to enable time and effort-saving assembly or detachment of the front panel. Particularly, for assembling the front panel, the front panel is aligned with a front plate of the computer housing and pushed toward the front plate, and the assembly will be completed automatically by hooks and engaging slots. When detaching the front panel, a release button disposed on the computer housing may be pressed to disengage the coupling mechanism, thereby detaching the front panel from the front plate.

One aspect of the present invention provides a computer housing including a front plate, a front panel and a fixing mechanism. The front plate has at least two holes respectively on two sides thereof The front panel has at least two engaging slots respectively corresponding to the at least two holes. The fixing mechanism includes two hooking plates and at least two springs. The hooking plates are slidably disposed on an inner side of the front plate of the computer housing respectively. Each of the hooking plates has at least one hook corresponding to one of the at least two holes, and the hooks respectively pass through the at least two holes to limit the two hooking plates to slide between a first position and a second position. Each of the springs connects the hooking plates of the fixing mechanism and the front plate of the computer housing and being pre-stretched to make the hooks abutting against an upper edge of the at least two holes to maintain the two hooking plates in the first position.

When the engaging slots of the front panel are respectively aligned with the holes on the front plate of the computer housing upon installation and the front panel is pushed toward the front plate of the computer housing, the hooks of the fixing mechanism may be biased from a first position toward a second position (disengaged position) and thus allowed to enter the corresponding engaging slots. The springs connecting the fixing mechanism and the computer housing will then pull the hooking plates back to the first position (engaged position), thus causing the hooks of the fixing mechanism to latch onto the corresponding holes on the front plate of the computer housing through the engaging slots of the front panel, thereby fixing the front panel onto the computer housing. On the other hand, when the two hooking plates are moved from the first position to the second position through the manipulation of a pre-arranged release button, the latch is released and thereby allowing the front panel to be removed from the front plate.

For further understanding of the present invention, reference is made to the following detailed description illustrating the embodiments and examples of the present invention. The description is for illustrative purpose only and is not intended to limit the scope of the claim.

DETAILED DESCRIPTION OF THE PREFERRED EMBODIMENTS

Figure 2:
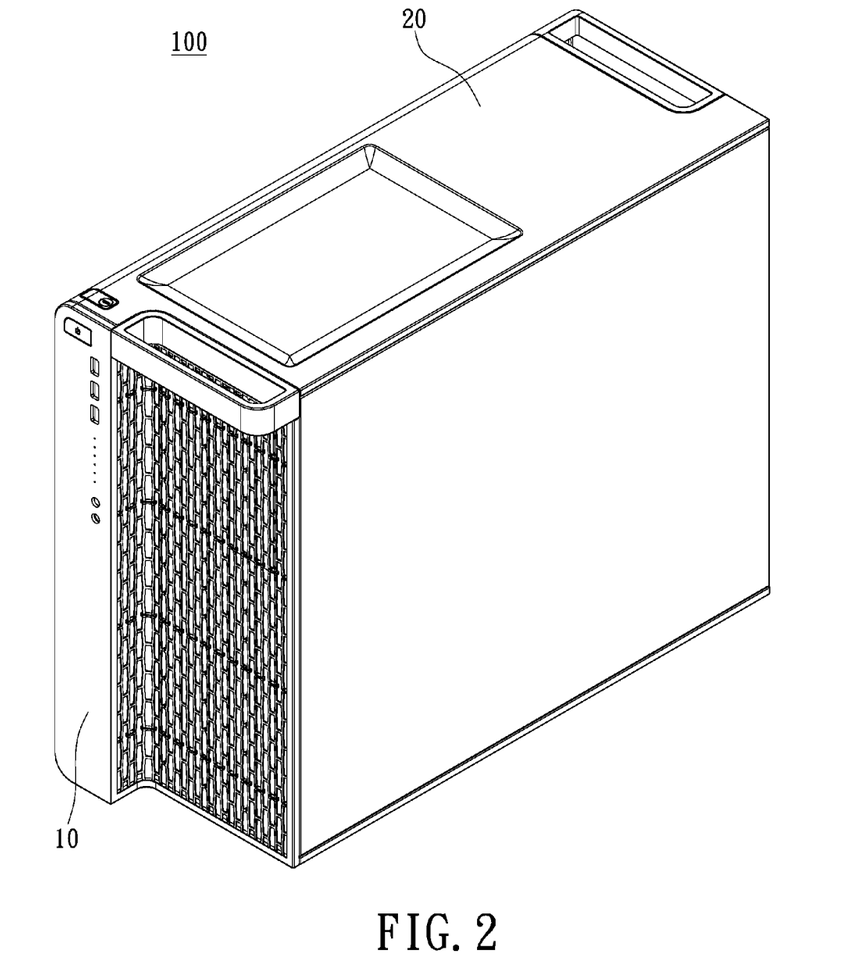
FIG. 2 is a perspective assembled view of a computer housing of the invention.
Figure 3:
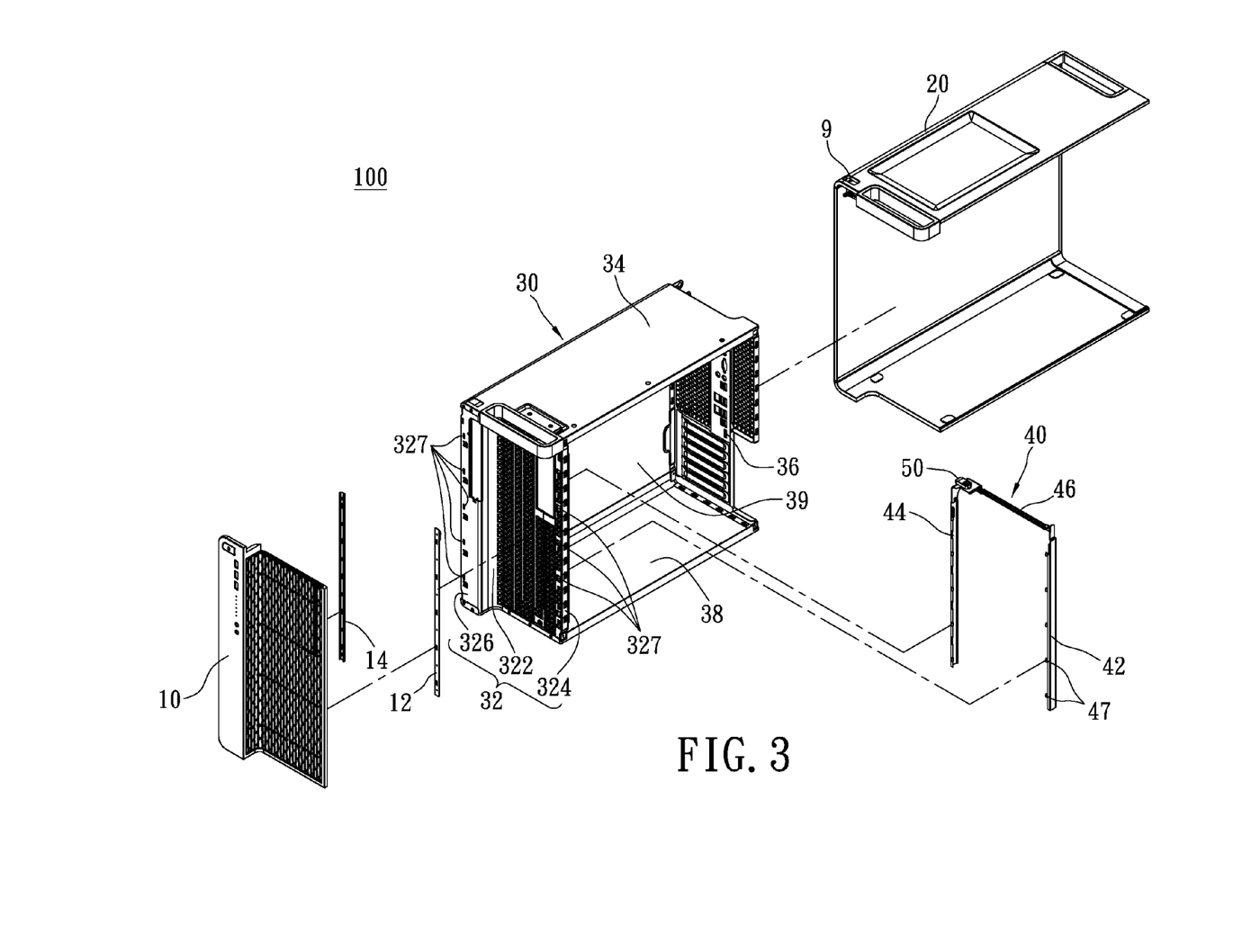
FIG. 3 is an exploded view of FIG. 2.

Referring to FIGS. 2 and 3, a computer housing 100 according to the instant disclosure includes a front panel 10, an outer casing 20, a housing body 30 and a fixing mechanism 40.

The outer casing 20 is assembled onto an outer surface of the housing body 30. The front panel 10 is fixed to a front plate 32 of the housing body 30 by the fixing mechanism 40. The structure is described as follows.

The housing body 30 includes a front plate 32, a top plate 34, a rear plate 36, a bottom plate 38 and lateral plates 39. The fixing mechanism 40 is slidably assembled on the front plate 32. The front plate 32 includes a front portion 322, a first lateral portion 324 and a second lateral portion 326. The front portion 322 connects the first lateral portion 324 and the second lateral portion 326. The first lateral portion 324 faces the second lateral portion 326. A plurality of holes 327 are formed respectively on the front portion 322 close to the first lateral portion 324 and the second lateral portion 326. In FIG. 3, five holes 327 corresponding to hooks 47 of the fixing mechanism 40 are respectively formed on locations of the front portion 322 respectively near to the first lateral portion 324 and the second lateral portion 326.

Figure 4A:
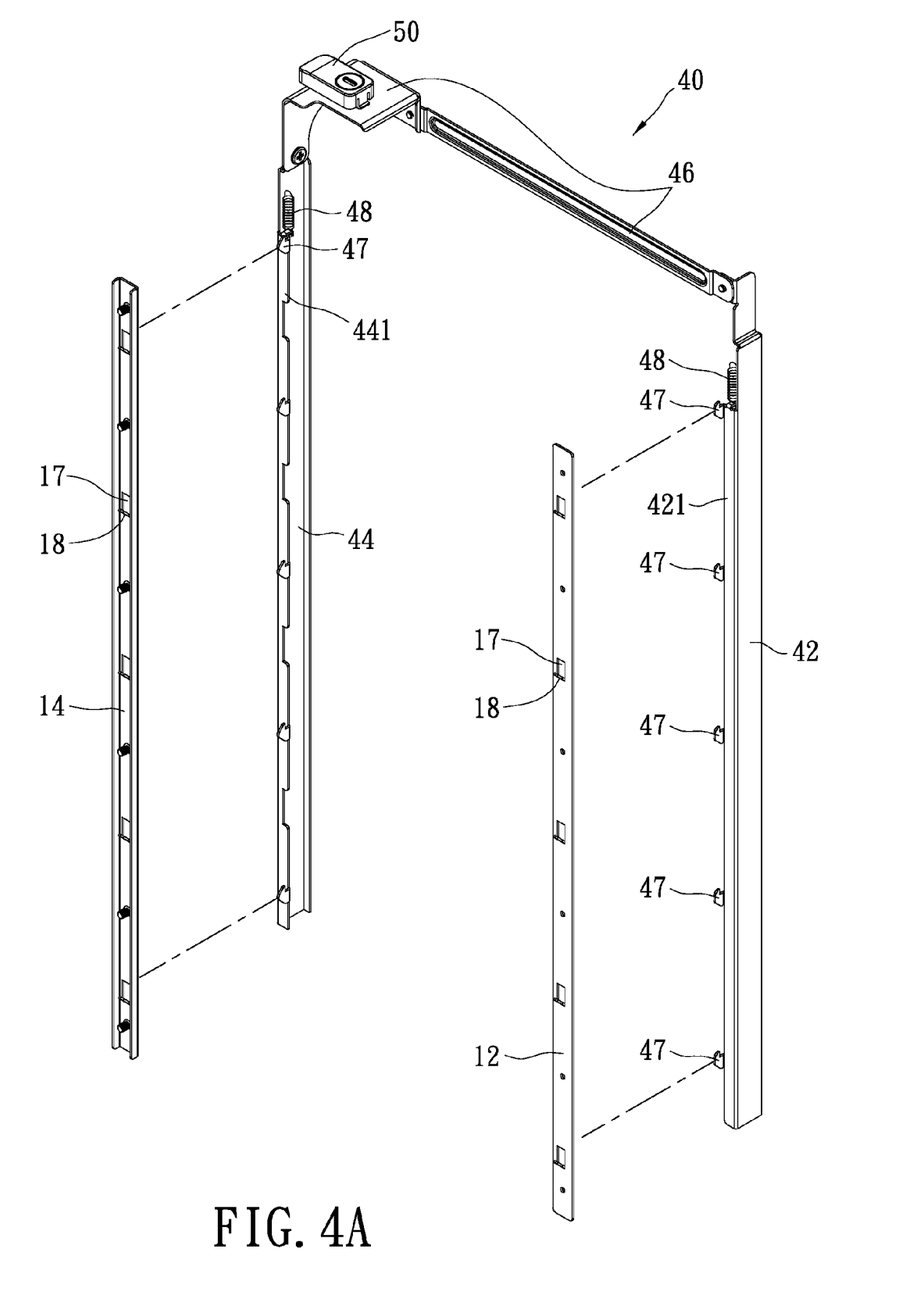
FIG. 4A is a partial enlarged view of a fixing mechanism of the computer housing of the invention.

Referring to FIG. 4A, the fixing mechanism 40 includes a first hooking plate 42, a second hooking plate 44, a central connecting element 46 and a spring 48. The first and second hooking plates 42 and 44 are stripe-shaped and have respective flanges 421 and 441 respectively vertical to the surfaces thereof. A plurality of hooks 47 protrude respectively from the flanges 421 and 441 and respectively perpendicular to the flanges 421 and 441. The hooks 47 correspond to the holes 327 on the front portion 322.

Figure 5:
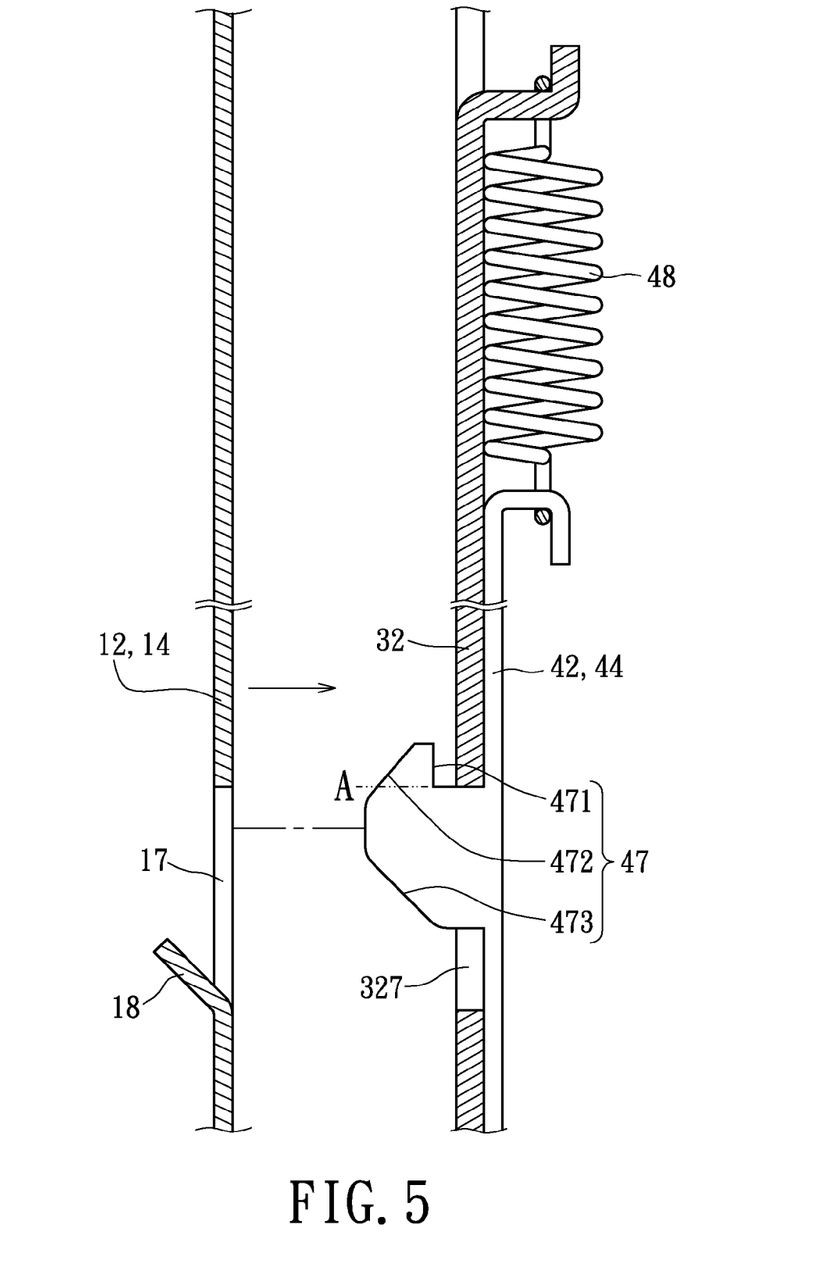
FIGS. 5 to 7 respectively illustrate the side views during a front panel assembled to the front plate, which show variation of the position of first or second hooking plate of the fixing mechanism with respect to the front plate of the computer housing and the first or second engaging plate.

The structure of the hook 47 is shown in FIG. 5 in detail. The hook 47 has a hook portion 471, a first slanted surface 472 and a second slanted surface 473. The hook portion 471 is a vertical protrusion of the hook 47 and faces the flanges 421 and 441 with a predetermined distance. The first slanted surface 472 is formed on the back side of the hook portion 471, and the second slanted surface 473 is formed under the first slanted surface 472.

Referring to FIG. 4A, the central connecting element 46 connects the first hooking plate 42 and the second hooking plate 44 to form a U-shaped structure and move the first and second hooking plates 42 and 44 synchronously.

Figure 4B:
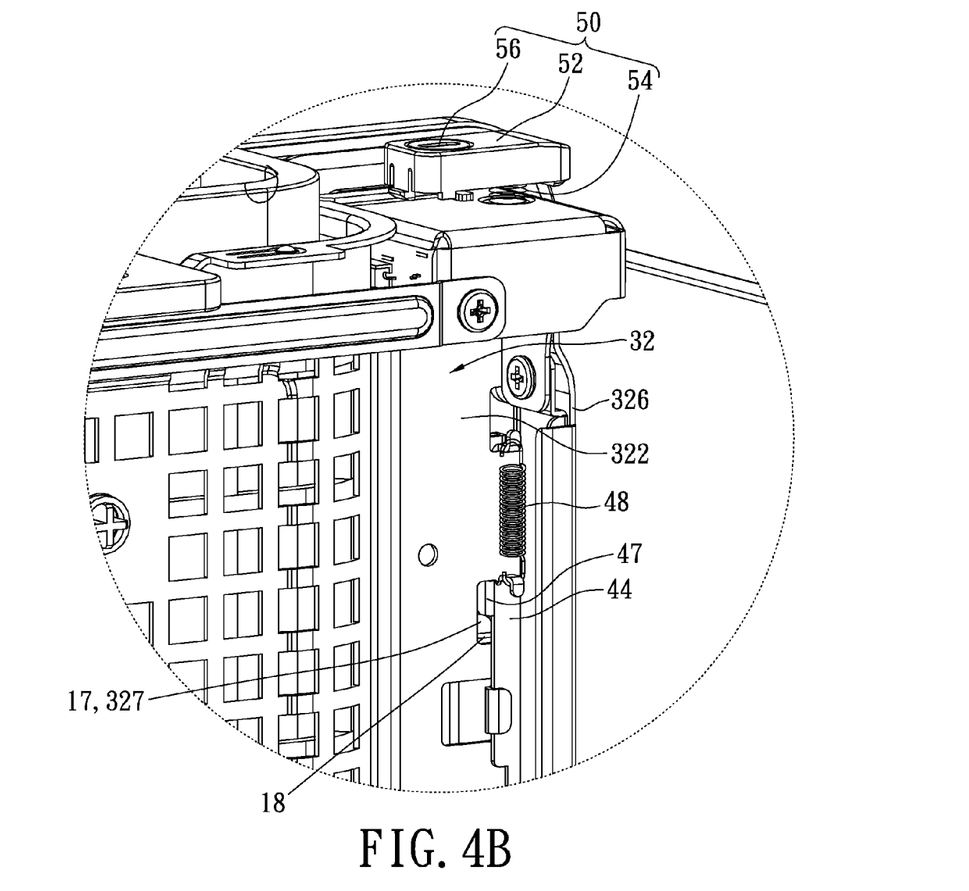
FIG. 4B is a partial enlarged view of the computer housing of the invention, which shows a spring connecting a hooking plate and a front plate.

The first hooking plate 42 and the second hooking plate 44 are respectively slidably disposed on respective inner sides of the first lateral portion 324 and the second lateral portion 326. The spring 48 is an extension spring which is respectively assembled between the first hooking plate 42 and the front portion 322 near to the first lateral portion 324 and between the second hooking plate 44 and the front portion 322 near to the second lateral portion 326. One end of the spring 48 is fixed to the front portion 322 near to the first lateral portion 324 or the front portion 322 near to the second lateral portion 326, and the other end of the spring 48 is fixed to the first hooking plate 42 or the second hooking plate 44(shown in FIG. 4B), whereby the spring 48 biases the first and second hooking plates 42 and 44. A button 50 is disposed between the top plate 34 and the outer case 20 and connected to the central connecting element 46. The outer case 20 has an opening 9 (shown in FIG. 3) through which the button 50 protrudes to be pushed by the user. The button 50 can be pushed to move the first and second hooking plates 42 and 44. The structure of the button 50 is described below in detail.

The front panel 10 has a first engaging plate 12 corresponding to the first hooking plate 42 and a second engaging plate 14 corresponding to the second hooking plate 44. The first and second engaging plates 12 and 14 are assembled respectively on an inner side of the front panel 10. A plurality of engaging slots 17 corresponding to the holes 327 and the hooks 47 are respectively formed on the first and second engaging plates 12 and 14. A respective slope 18 extends forward from the first and second engaging plates 12 and 14 at the lower edge of the respective engaging slot 17.

The hook 47 passes through the hole 327 of and moves or slides between a first position A (shown in FIG. 5) limited by the upper edge of the hole 327 opposite to the slope 18 and a second position B (shown in FIG. 8) limited by the slope 18. The springs 48 are pre-stretched to respectively pull the first hooking plate 42 and the second hooking plate 44 by the elastic force, whereby the respective hooks 47 thereof abut against the upper edges of the respective holes 327 and are maintained in the first position A, as shown in FIG. 5.

Figure 6:
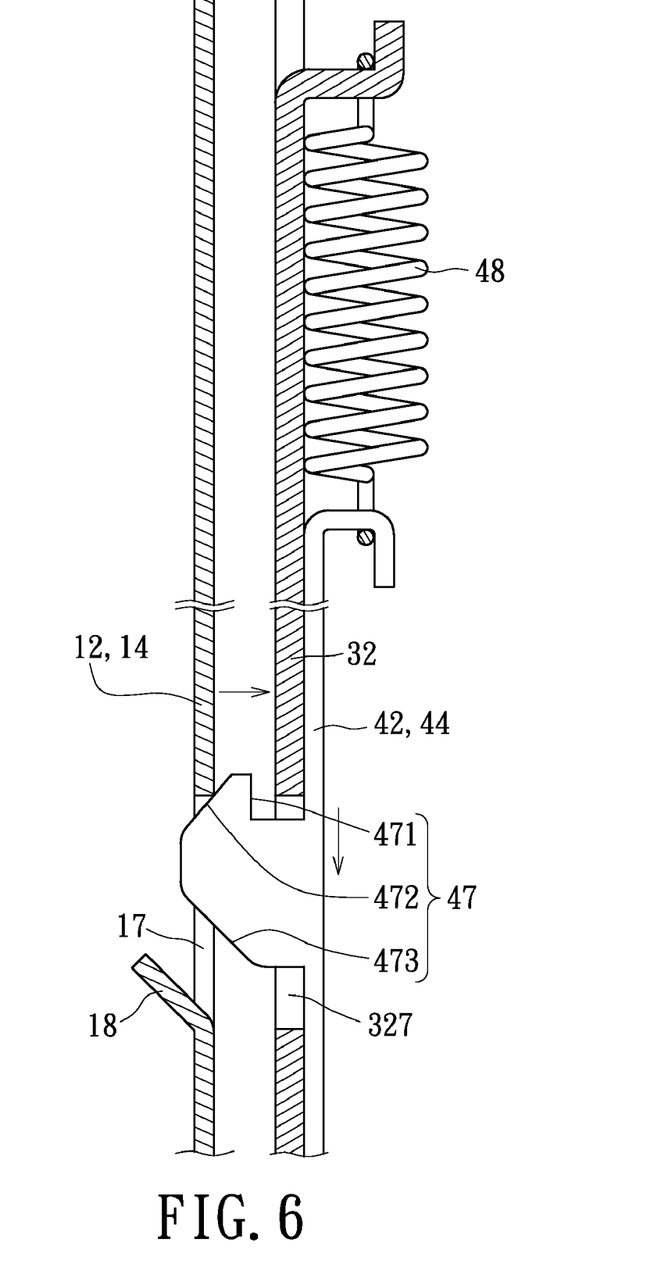
Figure 7:
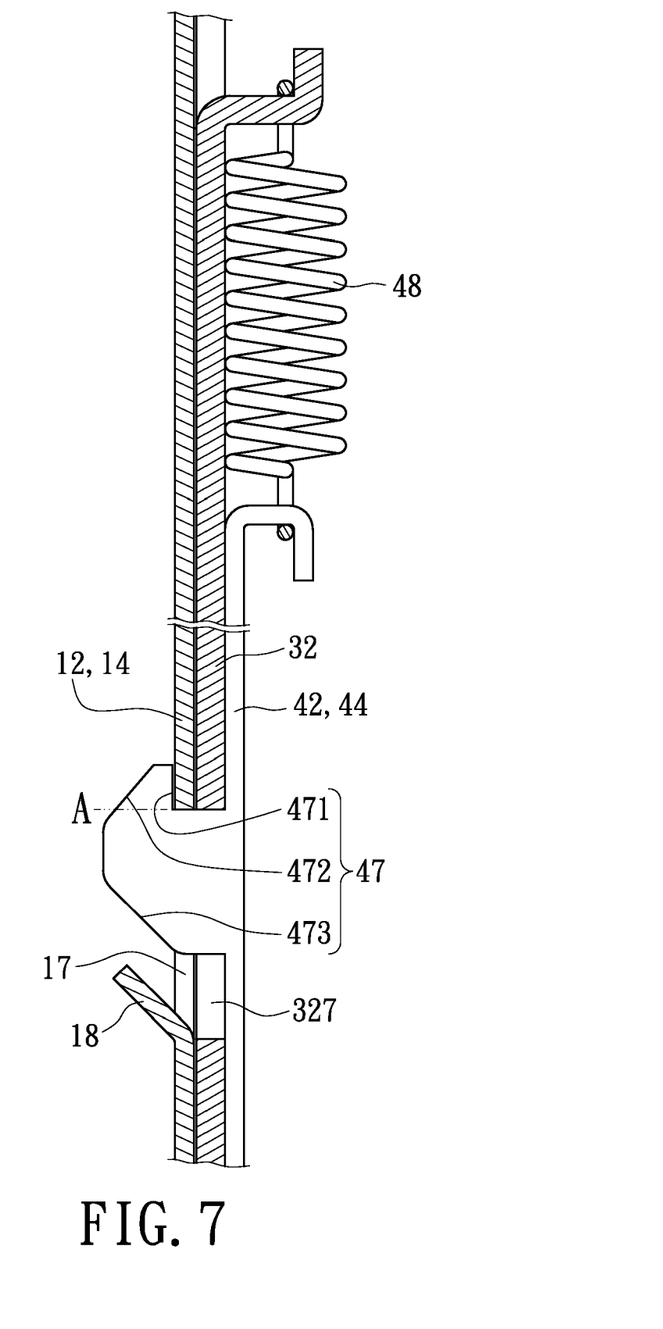

Referring to FIGS. 5 to 9, since the first engaging plate 12 and the second engaging plate 14 are fixed onto the front panel 10, for the sake of clarity, the front panel 10 is omitted and the first engaging plate 12 and the second engaging plate 14 are used to represent the front panel 10. When the front panel 10 is assembled to the computer housing 100, the front panel 10 is moved toward and is to be pressed onto the front plate 32 in such a manner that the engaging slots 17 of the first engaging plate 12 and the second engaging plate 14 are respectively aligned with the respective holes 327 of the first hooking plate 42 and the second hooking plate 44. Specifically, when the front panel 10 is moved and pushed toward the front plate 32 (as shown by a right arrow in FIGS. 5 and 6), the upper edges of the respective engaging slots 17 push against the first slanted surfaces 472 of the respective hooks 47 to move the first hooking plate 42 and the second hooking plate 44 downward (as as shown by the downward arrow in FIG. 6) and away from the first position A. At this time, the spring 48 is thus pulled, as shown in FIG. 6 to an extent that the hook 47 passes through the engaging slot 17. Then, the hook 47 is pulled back to the first position A by the resilient force of the spring 48 such that the hook portion 471 of the hook 47 abuts against the engaging slot 17, as shown in FIG. 7. In addition, several positioning posts (not shown) disposed on the inner side of the front panel 10 are respectively inserted into several extruding holes (not shown) formed on the front plate 32 so as to assist positioning of the front panel 10. Thereby, the front panel 10 is combined to the front plate 32.

Figure 8:
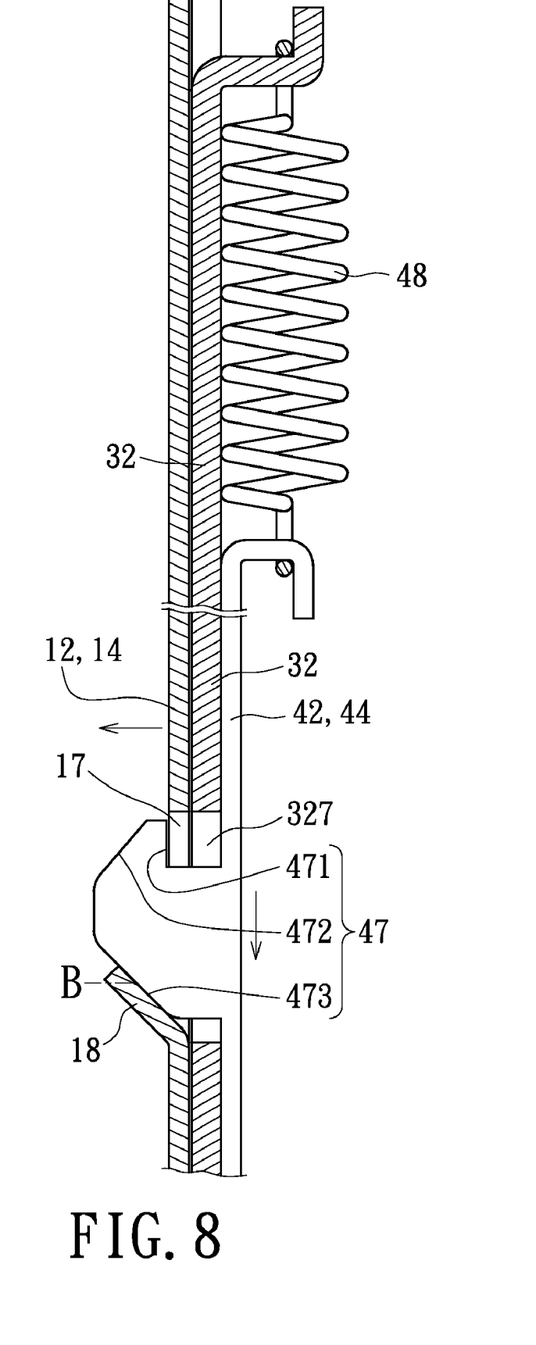
FIGS. 8 and 9 respectively illustrate the side views during a front panel detached from the front plate, which show variation of the position of the first or second hooking plate of the fixing mechanism with respect to the front plate of the computer housing and the first or second engaging plate.
Figure 9:
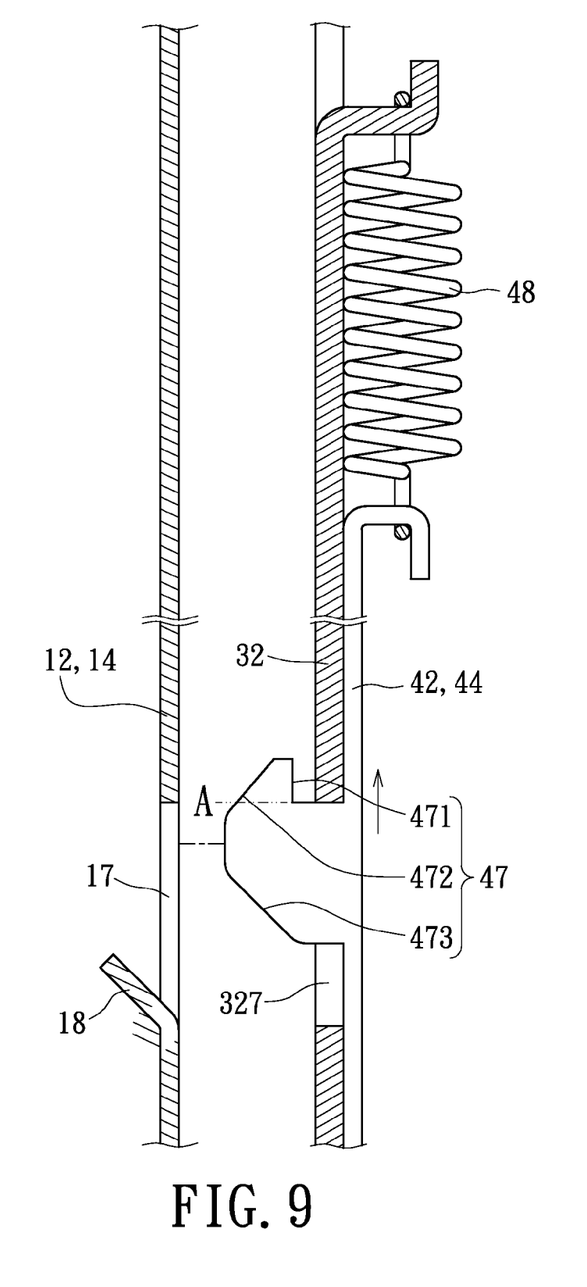

When the front panel 10 is to be removed, the button 50 is pushed to move the first hooking plate 42 and the second hooking plate 44 from the first position A to the second position B as shown in FIG. 8. At this time, the hook portion 471 is aligned with both the engaging slot 17 and the hole 327 to release the engagement of the hook 47 with the engaging slot 17 and the hole 327. At this time, the spring 48 is pulled to have a resilient force applied on the first and second hooking plates 42 and 44 respectively afterwards, and the second slanted surface 473 of the hook 47 abuts against the slope 18 to product a repulsive force as shown in a left arrow in FIG. 8 to spontaneously separate the front panel 10 from the front plate 32 as shown in FIG. 9. Thus, the front panel 10 may be easily detached from the front plate 32.

Figure 10:
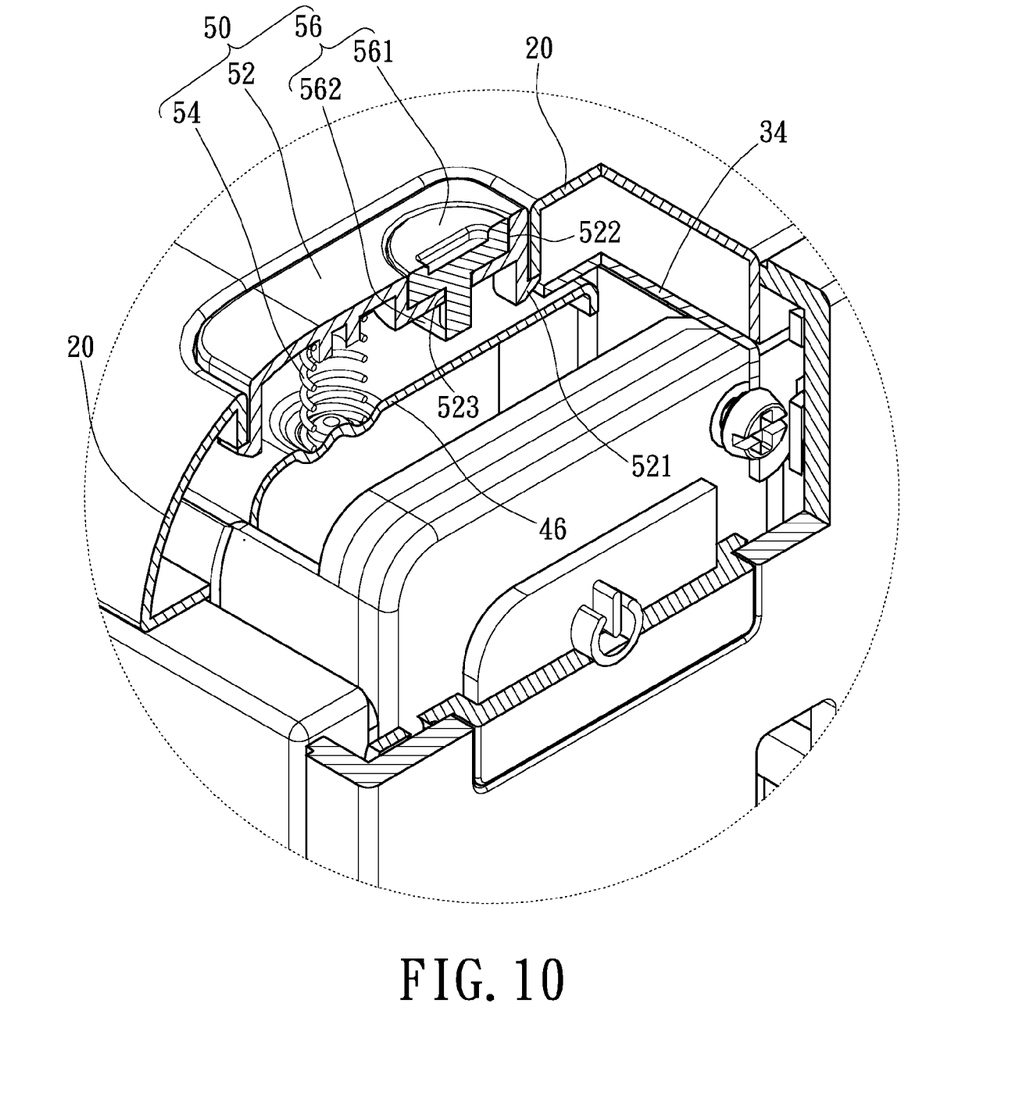
FIG. 10 is a perspective cross-sectional view of a button of the invention.

Referring to FIG. 10, the button 50 includes a main body 52, a compression spring 54 and a latch mechanism 56. One end of the compression spring 54 is fixed to the main body 52 and the other end of the compression spring 54 is fixed to the central connecting element 46. When the main body 52 is pressed, the compression spring 54 is pushed and biases the central connecting element 46 to move the first and second hooking plates 42 and 44 from the first position A to the second position B.

The latch mechanism 56 includes a rotatable element 561 and an extension element 562 connected to the rotatable element 561. The rotatable element 561 is rotatably disposed in a depression 522 of the main body 52. The extension element 562 extends from the rotatable element 561 through a hole 523 to beneath the main body 52. In this embodiment, the extension element 562 is L-shaped and the main body 52 has an abutting portion 521 abutting against the outer case 20.

Figure 11:
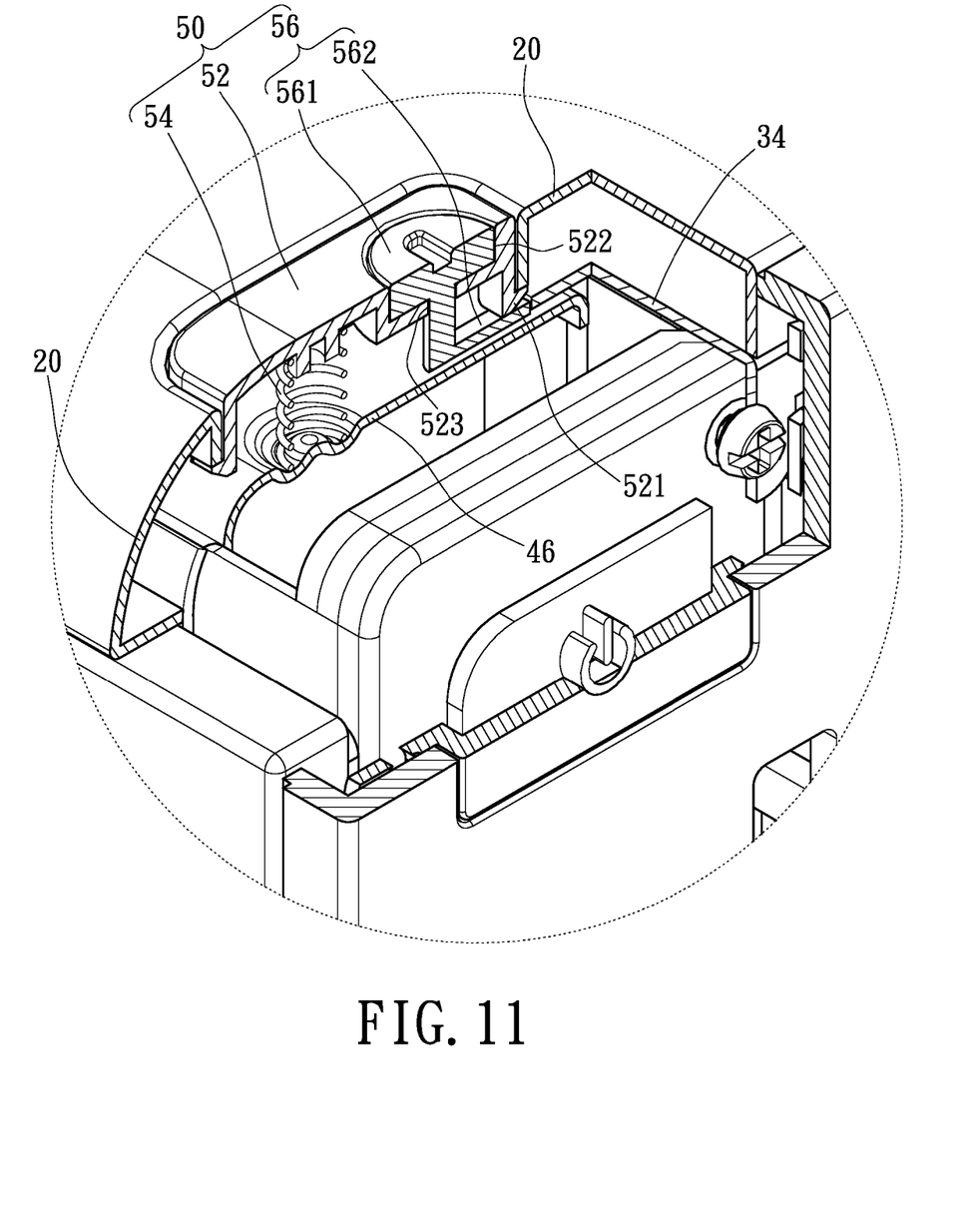
FIG. 11 is another perspective cross-sectional view of a button of the invention.

Referring to FIG. 11, the abutting portion 521 is separated from the central connecting element 46 at a short distance. The extension element 562 is moved between the abutting portion 521 and the central connecting element 46 along with the rotation of the rotatable element 561. At this time, the main body 52 is obstructed by the extension portion 562 and cannot be pressed so as to achieve the purpose of lock up. The latch mechanism 56 may lock up the button 50 to avoid improper operation and theft.

Figure 12:
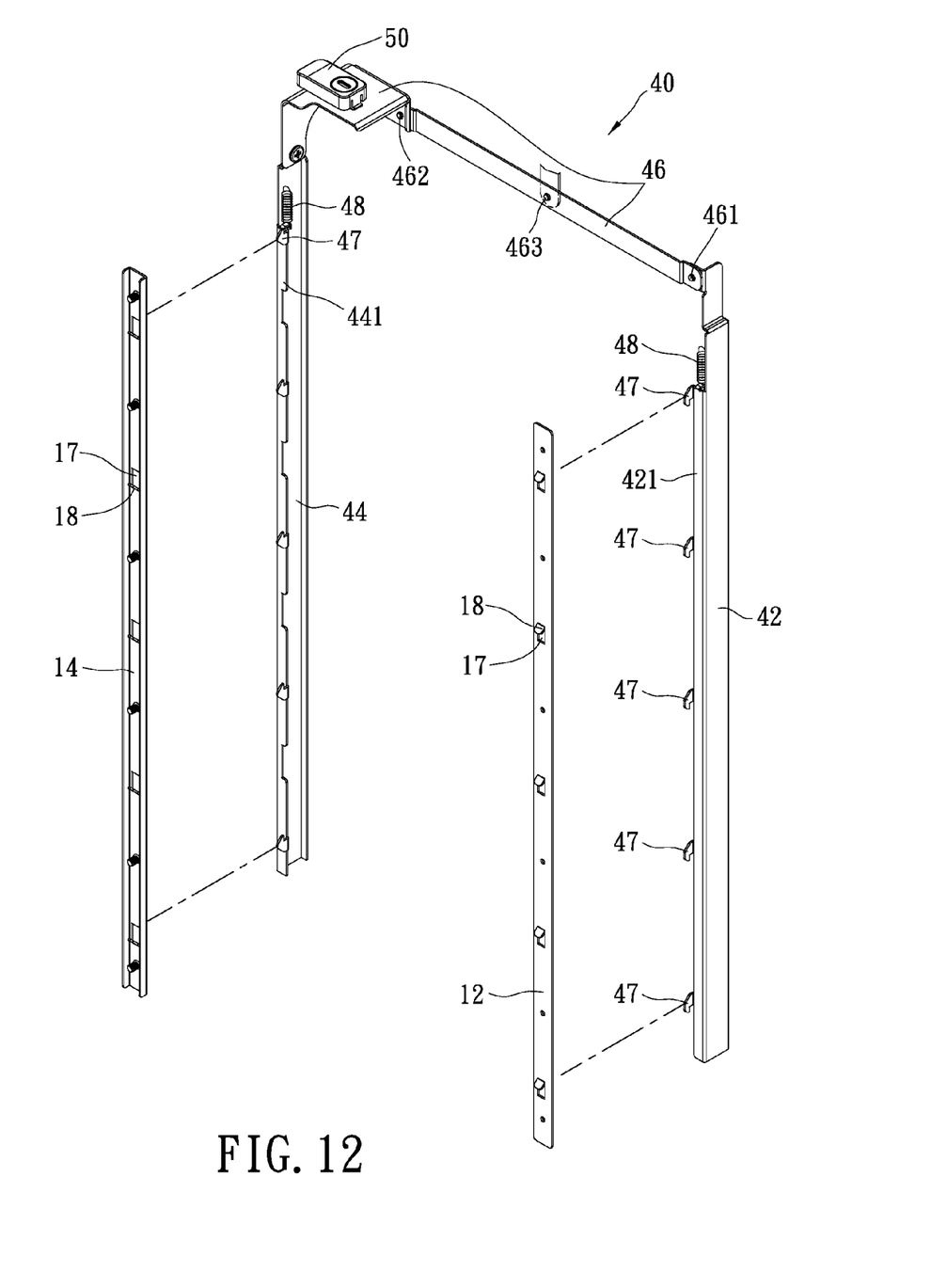
FIG. 12 shows another embodiment of a central connecting element of the invention.

In addition, the central connecting element 46 has another embodiment shown in FIG. 12. The central connecting element 46 is respectively connected to the first hooking plate 42 by a fixing elements 461 (such as a screw) and to the second hooking plate 44 by a fixing element 462. A pivot shaft 463 is disposed at the center of the central connecting element 46. A lower end of one spring 48 is connected to the second hooking plate 44 and an upper end thereof is connected to the front plate 32. An upper end of another spring 48 is connected to the first hooking plate 42 and a lower end thereof is connected to the front plate 32. When the button 50 is pushed, the second hooking plate 44 is moved downward and the central connecting element 46 is rotated counterclockwise about the pivot shaft 463 to move the first hooking plate 42 upward.

In addition to the above-mentioned embodiments, the central connecting element can be eliminated, and handles are respectively disposed on the first and second hooking plates. The handles exposed from the outer case are pressed to respectively move the first and second hooking plates from the first position A to the second position B.

The invention has the following advantages.

The front panel is assembled or detached without any tool, whereby the labor and time for assembly and maintenance are saved.

It is very easy to replace or assemble a fan filter or storage device via the front plate due to the simple and convenient operation of assembly or detachment of the front panel.

Since the button has a latch mechanism, the button of the front panel is also provided with a burglarproof function.

This invention is applicable to a slim front panel design to enhance the higher rigidity of the front panel.

The description above only illustrates specific embodiments and examples of the present invention. The present invention should therefore cover various modifications and variations made to the herein-described structure and operations of the present invention, provided they fall within the scope of the present invention as defined in the following appended claims.

What is claimed is:

1. A computer housing, comprising:
    a front plate having at least two holes formed respectively on two sides thereof;
    a front panel having at least two engaging slots respectively corresponding to the at least two holes; and
    a fixing mechanism comprising:
        two hooking plates slidably disposed on an inner side of the front plate respectively, and each of the hooking plates having at least one hook corresponding to one of the at least two holes, wherein the hooks respectively pass through the at least two holes to limit the two hooking plates to slide between a first position and a second position; and
        at least two springs respectively connecting the hooking plates and the front plate and being pre-stretched to make the hooks respectively abutting against an upper edge of the at least two holes to maintain the two hooking plates in the first position;
    whereby when the front panel is moved toward the front plate and the engaging slots are respectively aligned with the holes, the at least two hooks are biased from the first position toward the second position, the hooks enter the corresponding at least two engaging slots, and the at least two springs pull the hooking plates back to the first position;
    wherein the at least two hooks correspondingly latch onto the at least two engaging slots and the at least two holes to couple the front panel and the front plate while in the first position;
    when the two hooking plates are moved from the first position to the second position, the at least two hooks are correspondingly released from the at least two engaging slots and the at least two holes, and the front panel is detached from the front plate.

2. The computer housing as claimed in claim 1, wherein the fixing mechanism further comprises a button connected to the two hooking plates, thereby the button is pushed to move the two hooking plates from the first position to the second position.

3. The computer housing as claimed in claim 2, wherein the button is exposed from the computer housing.

4. The computer housing as claimed in claim 2, wherein the fixing mechanism further comprises a central connecting element connecting the two hooking plates to form a U-shaped structure, and the button is connected to the central connecting element.

5. The computer housing as claimed in claim 4, wherein the button comprises a main body and a compression spring connected to the main body and the central connecting element, and when the main body is pushed, the main body moves to push the compression spring and contact the central connecting element to move the two hooking plates from the first position to the second position.

6. The computer housing as claimed in claim 5, wherein the button further comprises a latch mechanism having a rotatable element disposed on the main body and an extension element connected to the rotatable element and penetrating through the main body, and when the rotatable element rotates to a appropriate position, the extension element is between the main body and the central connecting element, whereby the main body is obstructed.

7. The computer housing as claimed in claim 1, wherein the at least one hook has a first slanted surface and a second slanted surface, and when the front panel is moved toward the front plate in such a manner that the engaging slots are aligned with the holes, the front panel pushes the first slanted surface to move the hook away from the first position.

8. The computer housing as claimed in claim 7, wherein each of the at least two engaging slot has a slope, and when the two hooking plate moves to the second position, the second slanted surface of each of the at least two hook abuts the slope.

9. The computer housing as claimed in claim 1, wherein the front panel has two engaging plates on which the at least two engaging slots are respectively formed.

10. The computer housing as claimed in claim 1, wherein the front plate comprises a front portion, a first lateral portion and a second lateral portion opposite to the first lateral portion, and the front portion connects the first lateral portion and the second lateral portion, and the at least two holes are respectively formed on two sides of the front portion, and the two hooking plates are respectively disposed on the first lateral portion and the second lateral portion.

* * * * *